United States Patent Office 2,901,458
Patented Aug. 25, 1959

2,901,458

PROCESS FOR REACTING A COPOLYMER OF AN ISOOLEFIN AND A CONJUGATED DIENE WITH A POLAR ORGANIC MONOMER AND PRODUCT THEREOF

Fred W. Banes, Westfield, and William P. Fitz Gerald, Florham Park, N.J., assignors to Esso Research and Engineering Company, a corporation of Delaware No Drawing. Application December 30, 1954
Serial No. 478,906

21 Claims. (Cl. 260—45.5)

This invention relates to the preparation of novel polar derivatives of an isoolefin-multiolefin copolymer by reacting it with unsaturated polar organic compounds, containing not only carbon and hydrogen but also at least one polar element such as oxygen or nitrogen, as for instance, acrylonitrile, vinyl pyridine, acrylic esters, etc.

Butyl rubber is a high molecular weight hydrocarbon copolymer of a monoolefin such as isobutylene with a minor amount of a multiolefin, preferably a conjugated diolefin of 4 to 6 carbon atoms, such as butadiene or isoprene. Recently polymers of this type have been made, as shown in U.S. Patents 2,356,127 and 2,356,128, which disclose copolymers having a relatively low unsaturation, as indicated by an iodine number of about 0.5 to 50, and for use as a synthetic rubber, preferably a Staudinger molecular weight of at least about 20,000 and possibly up to 100,000 or 200,000.

Compared to natural rubber having an iodine number of 350 or so, these synthetic Butyl rubber polymers are more difficult to vulcanize, and generally require the use of ultra accelerators and higher curing temperatures than used with natural rubber. This indicates that even though the commercial Butyl rubber such as marketed under the designation GR–I, has an iodine number in the range of 1 to 10, it is relatively chemically resistant. Thus it resists attack by the common acids and alkalis and many other chemical agents.

On account of the fact that Butyl rubber consists entirely of carbon and hydrogen, it lacks some special properties which are sometimes present in natural polymer materials such as natural rubbers and resins, which appear to be imparted by polar elements. Thus, it would be desirable to have some polar elements present in the Butyl rubber, but this has been difficult to accomplish because most of the readily available polar monomers, such as arcrylonitrile and the alkyl methacrylates do not polymerize with the Fridel-Crafts low temperature technique used for making Butyl rubber, and therefore cannot be copolymerized in the original Butyl rubber molecular structure.

It has now been found that unsaturated polar monomers can be caused to react with isoolefin-multiolefin copolymers of relatively low molecular weight range and relatively high unsaturation, and thus polar elements may be added onto the copolymer molecular structure.

For purposes of this invention, the isoolefin-multiolefin copolymer to be used should in general have a Staudinger molecular weight range from about 4,000 to about 60,000, preferably about 10,000 to 40,000. The iodine number should be about 20 to 100, preferably about 30 to 80, or, in other terms, it should have a mole percent unsaturation (by the iodine-mercuric acetate method) of about 5 to 50, preferably about 7 to 40.

Although it is difficult to make high molecular weight GR–I type Butyl polymers (with molecular weights of 20,000 to 100,000) having much higher unsaturation than the commercial range of 0.5 to 2.5 mole percent, it is possible to make polymers having relatively higher unsaturation, e.g. from 5 to 20 or so mole percent, if the molecular weight is kept down in the range of 10,000 to 40,000.

The chemical activity, or susceptibility to chemical reaction of such polymers will vary directly with the mole percent unsaturation and inversely with the molecular weight, and thus the relative degree of chemical inertness may be expressed mathematically in a rough way by the ratio of the Staudinger molecular weight divided by the mole percent unsaturation. This may be an indication of the average or relative chain length between olefin groups in the polymer molecules. For instance, a GR–I Butyl rubber having a Staudinger molecular weight of 45,000 and an unsaturation of 1.5 mole percent will have an inertness index of $$\frac{45,000}{1.5} = 30,000$$

Even Butyl rubber of relatively lowest molecular weight commercially available, e.g., about 20,000 molecular weight, and of the relatively highest unsaturation commercially available, e.g., about 2.5 mole percent, would thus have an inertness index of $$\frac{20,000}{2.5} = 8,000$$

On the other hand, for commercial synthetic rubber uses, it may be desirable to use Butyl rubbers having even higher molecular weights and lower unsaturation, thus having an inertness index ranging up to 100,000 or 200,000.

However, for the purposes of the present invention only isoolefin-multiolefin copolymers of a relatively low inertness index of about 500 to 10,000, preferably 1,000 to 5,000, should be used. For instance, a polymer having a Staudinger molecular weight of 10,000 should preferably have a mole percent unsaturation of about 5 to 10, whereas a polymer having a higher molecular weight of about 30,000 should have a higher mole percent unsaturation of about 10 to 20.

The unsaturated polar monomers to be used according to the present invention (for reaction with such isoolefin-multiolefin copolymer of low inertness index), may be selected from a wide group of organic compounds. Suitable nitrogen-containing monomers include acrylonitrile, methacrylonitrile, vinyl pyridine and its methyl or other low alkyl derivatives.

Oxygen-containing monomers which may be used include acrylic esters and methacrylic esters of the various alcohols ranging, for instance, from 1 to 20 carbon atoms, e.g. methyl, ethyl, butyl, decyl, lauryl, hexadecyl, octadecyl, etc., or various vinyl ethers, e.g. vinyl isobutyl ether, vinyl esters such as vinyl acetate, etc. Also, one many use unsaturated polar compounds of other polar elements, bis(betachloroethyl) vinyl phosphonate, vinyl triethoxy silane, etc. Mixtures of two or more different materials in the same class or different classes of the above materials may be used, especially for making polyfunctional reaction products.

The proportions in which the above-described polar monomers are to be used may range widely according to the intended use of the final product, and according to the ability of the isoolefin-multiolefin copolymer and polar compound to react with each other, but normally should range from about 5 to 200, preferably 10 to about 100, parts by weight of the polar monomer to 100 parts by weight of the isoolefin-multiolefin copolymer.

In order to effect the desired reaction, it is desirable to have a diluent or solvent present to the extent of about 1 to 10 volumes per volume of reactants, or about 100 to 1,000 cc. per 100 grams of reactants. Such solvents may be selected from those that are unreactive in the presence of free radicals. Hydrocarbon solvents such as cyclohexane, benzene, n-hexane, petroleum ether, n-heptane, n-octane, etc., or mixtures of these may be used and are preferred. Oxygenated solvents such as tertiary butyl alcohol, di-alkyl ethers, etc., may also be used.

It is also desirable to use a catalyst to make the polar monomer react with the isoolefin-multiolefin copolymer. Materials such as benzoyl peroxide, ditertiary butyl peroxide, cumene hydroperoxide, tertiary butyl hydroperoxide, 2,2-bis tertiary butyl peroxy butane, hydrogen peroxide, etc., may be used. Generally, the amount thereof should be about 0.1 to 2.0%, preferably 0.3 to 1.0%, based on reactants.

The temperature at which the reaction takes place is partly dependent on the thermal decomposition temperature of the peroxide used, but is usually about 50 to 200° C., preferably about 75 to 175° C., and the time required ranges from about 1 to 10 hours, generally about 2 to 5 hours.

The order in which the reactants, solvent, and catalyst may be added can be varied, according to the reactivity of the materials involved. For example, all the materials may be mixed together at room temperature and then heated using a reflux condenser if the solvent used is volatile under the reaction temperature used. Such method is particularly suitable where the amount of inert solvent used is sufficient to prevent undue reactivity upon initial mixing or initial heating. If the reactants, such as especially acrylonitrile and vinyl pyridine, are particularly active in polymerization tendency, and perhaps therefore may tend to make a homopolymer instead of adding on to the isoolefin-multiolefin copolymer, the polar monomer may be added in successive increments or continuously over a period of time. Also, if various polar monomers are to be used the reaction may be run to at least partial completion with one polar monomer, one or more additional polar monomers are added. It may also be desirable to add the catalyst in different proportions, part with the isoolefin-multiolefin copolymer and part with the polar monomer.

The solvent may be either a single material which is a solvent both for the isoolefin-multiolefin copolymer and for the polar monomer, and part of the solvent may be used with each, or the copolymer may be dissolved in a pure hydrocarbon solvent while the polar monomer is dissolved in a polar solvent, and then the two solutions may be mixed.

The exact nature of the chemical reaction or reactions involved is not well understood, but it is believed that the unsaturated polar monomer forms a chemical addition product on the isoolefin-multiolefin copolymer, at or adjacent to the point of unsaturation on the copolymer. It may be that only one molecule of the monomer reacts at that point, or it is also possible that a number of units of the monomer may build onto each other to form segmented polymers. It is possible that a number of molecules of polar monomer may polymerize entirely with each other, to form polar homopolymer molecules, which in some cases may be oil-insoluble, which are not attached in any way to the isoolefin-multiolefin copolymer molecules, but this is undesirable and should be avoided by adjusting the polymerization conditions such as the proportion of solvent, the temperature, etc., or the polar monomer may be added in successive increments instead of all at once at the beginning of the reaction.

The resulting reaction products are polar derivatives of the isoolefin-multiolefin copolymer, and they form a new class of polymer products. These materials range in texture and consistency from oily, semi-solids to tacky, rubbery plastics. They are useful per se for making molded and extruded plastic products, and can also be rolled out into thin supporting films. These products may, due to the presence of some residual unsaturation, be cured to produce plastic and rubbery products of higher tensile strength and modulus and greater rigidity. If the polar group is one such as acrylonitrile which normally, per se, would form an oil-insoluble homopolymer, even substantial amounts thereof may be reacted onto the isoolefin-multiolefin copolymer without making the product oil-insoluble, thus proving that it is a true reaction product and not a mere mixture, but even more may be reacted to make the resultant reaction product at least oil-resistant or actually oil-insoluble, but it will still be essentially a single material and not a mere mixture of isoolefin-multiolefin copolymer and homopolymer of the polar substance.

These products may be used, in amounts of about 1 to 30% or so, as plasticizers for natural and synthetic rubber of various types such as Butyl rubber diene-styrene rubber, diene-nitrile rubber, etc., as well as various natural and synthetic resins and plastics such as polyvinyl chloride, polyacrylonitrile, and styrene-acrylonitrile copolymers. They may also be used as a curable adhesive or cement for bonding rubber to rubber, rubber to fibers or cloth, etc.

When used in minor amounts, they may be used as dispersing aids or modifiers for pigments and reinforcing agents in rubber, plastics, etc., and grease formulations, and also as pour depressants, V.I. improvers, oil-soluble detergents or sludge dispersers, and anti-wear agents in lubricating oils. When used as lube oil additives, they should normally be used in a concentration of about 0.1 to 10%, preferably about 1 to 5%. They may also be used in similar concentrations as additives in solid petroleum hydrocarbon fractions such as paraffin wax, microcrystalline wax, asphalt, etc.

The details and advantages of the present invention will be better understood from a consideration of the following experimental data:

EXAMPLE 1

A mixture of 100 grams of high unsaturation isobutylene-isoprene copolymer (12,500 Staudinger, 7.40 mole percent unsaturation made by copolymerizing 3 parts by wt. of isobutylene with 1 part of isoprene in 3 volumes of methyl chloride as solvent, solid $CO_2$ in naphtha as refrigerant, and a solution $AlCl_3$ in $CH_3Cl$ as catalyst), 280 grams of n-heptane, and 0.3 gram of benzoyl peroxide was placed in a 1000 cc. flask. This mixture was stirred and heated until the temperature had reached 95° C. A solution of 0.2 gram of benzoyl peroxide in 15 cc. of di-ethyl ether was mixed with 10 grams of redistilled acrylonitrile and diluted to 100 cc. with n-heptane. This mixture was added slowly and continuously to the polymer solution. The addition of the acrylonitrile solution consumed 45 minutes.

The reflux temperature was maintained at 95° C. for 4 hours. The reaction mixture was cooled, transferred to a short path still and heated to a pot temperature of 45° C. at 1 mm. of Hg to strip off the solvent and unreacted acrylonitrile. The product contained 0.91 weight percent nitrogen equivalent to 3.4 weight percent acrylonitrile. The product was oil soluble indicating that it was a copolymer.

EXAMPLE 2

A mixture of 50 grams of high unsaturation isoolefin-multiolefin copolymer (11,400 Staudinger, 7.7 mole percent unsaturation), 125 grams of n-heptane, and 0.3 gram of benzoyl peroxide was heated to 95° C. in a 1000 cc. flask. A solution of 10 grams of freshly distilled 2-vinyl pyridine and 0.2 gram of benzoyl peroxide in 90 grams of pyridine was slowly added to the polymer solution over a 94 minute interval. The reaction mixture was stirred at 95° C. for an additional 30 minutes after which it was cooled and stripped of solvent and unreacted vinyl pyridine. The product weighed 52.5 grams and contained 0.56 weight percent nitrogen; equivalent to 4.22 weight percent vinyl pyridine. The product was a copolymer rather than a mixture as demonstrated by its solubility in oil.

EXAMPLE 3

A solution of 50 grams of an isobutylene-isoprene copolymer (19,400 Staudinger, 7.5 mole percent unsaturation) in 120 grams of n-heptane was mixed with 45 grams of lauryl methacrylate (made from a commercial lauryl alcohol containing about 3% $C_{10}$, 61% $C_{12}$, 23% $C_{14}$, 11% $C_{16}$ and 2% $C_{18}$ alkanols), 250 cc. of benzene, and 1.0 gram of benzoyl peroxide. This mixture was charged to a 1 liter stainless steel bomb and heated to 90° C. for 4 hours.

At the expiration of this time, the reaction mixture was recovered and vacuum stripped to remove the solvents and unreacted methacrylate. The product amounted to 56 grams.

EXAMPLE 4

A mixture of 50 grams of an isobutylene-isoprene copolymer (11,400 Staudinger, 7.7 mole percent unsaturation), 125 grams of n-heptane, 45 grams of stearyl methacrylate, 250 cc. of benzene, and 1.0 gram of benzoyl peroxide was charged to a 1 liter stainless steel bomb. The bomb was agitated in the conventional manner and heated to 90° C.; this temperature was maintained for 4 hours.

After cooling, the reaction mixture was withdrawn from the bomb and distilled in a short path still to an overhead temperature of 160° C. at 0.6 mm. of Hg. The residue, a light, elastic solid, weighed 69 grams.

EXAMPLE 5

A 1 liter stainless steel bomb was charged with a mixture consisting of 50 grams of high unsaturation isoolefin-multiolefin copolymer (11,400 Staudinger, 7.7 mole percent unsaturation), 45 grams of lauryl methacrylate, 360 cc. of n-heptane, and 2.0 grams of di-tertiary butyl peroxide. The bomb was shaken on a conventional shaker and heated to 150° C. for 4 hours.

At the end of this time, the bomb was cooled and the reaction mixture transferred to a short path still where it was stripped to an overhead temperature of 140° C. at 0.25 mm. of Hg. The residue weighed 60 grams.

EXAMPLE 6

A 50 gram sample of high unsaturation isoolefin-multiolefin copolymer (31,000 Staudinger, 13.1 mole percent unsaturation) was dissolved in 273 grams of n-heptane. To this solution was added 40 grams of freshly distilled vinyl acetate and 0.5 gram of benzoyl peroxide. The resulting mixture was placed in a 1 liter stainless steel bomb and heated to 95° C. for 4 hours.

At the end of this time, the mixture was placed in a short path still and the solvent and unreacted ester removed by distilling to an overhead temperature equivalent to 150° C. at atmospheric pressure. The product weighed 64.3 grams.

EXAMPLE 7

A solution of 50 grams of isobutylene-isoprene copolymer (19,400 Staudinger, 7.5 mole percent unsaturation) in 120 grams of n-heptane was mixed with 45 grams of lauryl methacrylate, 250 cc. of benzene, and 1.0 gram of benzoyl peroxide. This mixture was charged to a 1 liter stainless steel bomb and heated to 90° C. for 4 hours.

At the expiration of this time the reaction mixture was recovered and vacuum stripped to remove the benzene, n-heptane, and unreacted lauryl methacrylate. About 75–80% of the latter material was recovered and could be recycled.

A sample of the copolymer-lauryl methacrylate product made by the procedure of Example 3 was blended with a paraffinic lubricating oil base stock and the viscosities of various blends determined. This experiment was repeated using n-butyl acrylate and n-hexyl methacrylate instead of the lauryl methacrylate. These data are compared in the following table:

| Compound | Wt. Percent Conc. | Kin. Vis., SUS | | A.S.T.M. Pour, ° F. | V.I. |
|---|---|---|---|---|---|
| | | 100° F. | 210° F. | | |
| Copolymer—LMA [1] | 1 | 192.2 | 47.81 | <−35 | 121 |
| | 3 | 237.4 | 52.60 | <−35 | 129 |
| | 6 | 339.8 | 62.53 | <−35 | 132 |
| Copolymer—nBA [2] | 3 | 224.5 | 50.63 | −20 | 123 |
| | 6 | 286.8 | 56.51 | −20 | 127 |
| Copolymer—nHMA [3] | 3 | 247.7 | 53.22 | −20 | 128 |
| | 6 | 361.3 | 64.12 | −20 | 131 |

[1] Copolymer—lauryl methacrylate reaction product.
[2] Copolymer—n-butyl acrylate reaction product.
[3] Copolymer—n-hexyl methacrylate reaction product.

NOTE.—The lube oil base stock used had a V.I. of 113–115, a viscosity of 45 seconds at 210° F. and a pour point of −20.

The isobutylene-isoprene copolymer reacted with lauryl methacrylate possesses greater V.I. potency than the other acrylate reaction products and is an effective pour depressant whereas the others show no pour depressing activity.

Monomeric acrylates in the range of $C_{10}$–$C_{18}$ can be used; lauryl methacrylate is particularly desirable because of its availability and cost.

EXAMPLE 8

The following blends of the product made in Example 1 were made with a paraffinic lube oil base stock, and the V.I.'s calculated:

| Blend No. | Wt. Percent Conc. in Base Stock | Kin. Vis., SUS | | A.S.T.M. Pour, ° F. | V.I. |
|---|---|---|---|---|---|
| | | 100° F. | 210° F. | | |
| | 0 | | 45 | −20 | 113 |
| 1 | 1 | 199.4 | 48.1 | −25 | 125 |
| 2 | 3 | 291.2 | 57.5 | −20 | 130 |
| 3 | 6 | 478.1 | 75.8 | −20 | 133 |

The detergency property of the product was determined by testing a blend consisting of 4 wt. percent additive in a paraffinic lube oil base stock in a Phorone-Sulfuric Acid test and a Low Temperature Dispersancy test. In the LTD test, the larger the volume of dispersed sludge, the better the additive. In the Phorone test, the more $H_2SO_4$ that can be added without forming sediment, the more effective the additive. The results are summarized below:

| Additive | Phorone—$H_2SO_4$ Test | | LTD Test |
|---|---|---|---|
| | Vol. 10% $H_2SO_4$ (cc.) | Sediment (mg.) | Vol. of Sludge, Dry (cc.) |
| Acrylonitrile modified copolymer | 8 | 0 | 0.75 |
| | 9 | 0 | |
| | 10 | 0 | |
| Commercial Det. Additive A | 8 | 105 | 0.35 |
| Commercial Det. Additive B: | | | |
| (6%) | | | 0.15 |
| (8%) | 8 | 12 | |

The acrylonitrile product was greatly superior to both commercial materials in detergency or sludge-dispersing properties.

Commercial detergents A and B are used in the formulation of automobile crankcase lubricants. The experimental additive is superior to the commercial additive A in the Phorone-$H_2SO_4$ test and to the commercial additive B in both tests even at concentrations of 6–8%.

EXAMPLE 9

Blends of the product made in Example 2 were made in mineral oil base stock and viscosity measurements made from which the viscosity index of each blend could be derived. These data are summarized below:

| Blend No. | Percent Additive in Base Stock | Vis. (SUS) at 210° F. | Viscosity Index |
|---|---|---|---|
|  | 0 | 46.17 | 115 |
| 4 | 1 | 49.80 | 124 |
| 5 | 3 | 60.13 | 129 |
| 6 | 5 | 85.14 | 131 |

A blend consisting of 4 weight percent of the material of Example 2 in paraffinic lube oil base stock was subjected to the tests described in Example 8. The following results were obtained:

Low temperature test

In the dry test it was impossible to centrifuge out any sludge when employing the specified conditions of the test. This indicates outstanding dispersancy properties.

Phorone test

| Volume 10% $H_2SO_4$: | Wt. sludge |
|---|---|
| 7 cc. | No sludge. |
| 9 cc. | No sludge. |

These results also indicate satisfactory sludge dispersancy properties.

It is not intended that this invention be limited to the specific examples or modifications which have been given merely for the sake of illustration, nor unnecessarily by any theory as to the mechanism of the operation of the invention, but only by the appended claims in which it is intended to claim all novelty inherent in the invention and all modifications coming within the scope and spirit of the invention.

We claim:

1. Process which comprises reacting as the sole ingredients 100 parts by weight of a rubber copolymer consisting of monomeric isobutylene and a conjugated diolefin of 4 to 6 carbon atoms, having a Staudinger molecular weight of about 4,000 to 60,000 and a mole percent unsaturation of about 5 to 40, with about 5 to 200 parts by weight of a polar organic monomer containing a terminal $CH_2=C<$ group and at least one element selected from the group consisting of oxygen and nitrogen, in the presence of about 1 to 10 volumes of inert diluent, and in the presence of a peroxide catalyst, at a temperature of about 50–250° C. for about 1 to 10 hours.

2. Process according to claim 1 in which the hydrocarbon copolymer has an inertness index of about 500 to 10,000.

3. A process which comprises reacting as the sole ingredients 100 parts by weight of a rubber copolymer consisting of monomeric isobutylene and isoprene, said copolymer having a Staudinger molecular weight of about 10,000 to 40,000 and a mole percent unsaturation of about 5 to 40 with about 10 to 100 parts by weight of a polar organic monomer containing a terminal $CH_2=C<$ group and at least one element selected from the group consisting of oxygen and nitrogen, in the presence of about 1 to 10 volumes of an inert solvent, and about 0.1 to 2.0% of an organic peroxide as catalyst, at a reaction temperature of about 50° to 200° C. for about 1 to 5 hours.

4. Process according to claim 3 in which the polar monomer is acrylonitrile.

5. Process according to claim 3 in which the polar monomer is vinyl pyridine.

6. Process according to claim 3 in which the polar monomer is an acrylic ester.

7. Process according to claim 3 in which the polar monomer is vinyl phosphonate.

8. Process according to claim 3 in which the polar monomer is vinyl triethoxy silane.

9. A reaction product consisting of about 100 parts by weight of a rubber copolymer consisting of a major proportion of monomeric isobutylene with a minor proportion of isoprene, said copolymer having a Staudinger molecular weight of about 4,000 to 60,000 and a mole percent unsaturation of about 5 to 40, with about 5 to 200 parts by weight of a polar organic monomer containing a terminal $CH_2=C<$ group and at least one element selected from the group consisting of oxygen and nitrogen.

10. Composition consisting of a solid selected from the group consisting of natural rubber, isobutylene-isoprene rubber copolymer, polyvinyl chloride, polyacrylonitrile and styrene-acrylonitrile copolymers, having homogeneously admixed therewith about 1 to 30% of the reaction product defined in claim 9.

11. Product according to claim 9 in which the polar monomer is vinyl phosphonate.

12. Product according to claim 9 in which the polar monomer is vinyl triethoxy silane.

13. Product according to claim 9 in which the diolefin is butadiene.

14. Product according to claim 9 in which the diolefin is isoprene.

15. Product according to claim 9 in which the polar monomer contains nitrogen.

16. Product according to claim 9 in which the polar monomer is acrylonitrile.

17. Product according to claim 9 in which the polar monomer is 2-vinyl pyridine.

18. Product according to claim 9 in which the polar monomer contains oxygen.

19. Product according to claim 18 in which the polar monomer is vinyl acetate.

20. Product according to claim 18 in which the polar monomer is an acrylate ester.

21. Product according to claim 20 in which the acrylate ester is a methacrylic ester of a $C_{10}$ to $C_{16}$ alcohol.

References Cited in the file of this patent

UNITED STATES PATENTS

| | | |
|---|---|---|
| 2,476,271 | Bartleson | July 19, 1949 |
| 2,595,140 | Heinrich | Apr. 29, 1952 |
| 2,609,353 | Rubens et al. | Sept. 2, 1952 |
| 2,610,962 | Smyers et al. | Sept. 16, 1952 |
| 2,634,256 | Sparks et al. | Apr. 7, 1953 |
| 2,668,806 | Haward et al. | Feb. 9, 1954 |
| 2,720,499 | Doak | Oct. 11, 1955 |